United States Patent
Jolly et al.

(10) Patent No.: US 9,286,293 B2
(45) Date of Patent: Mar. 15, 2016

(54) POPULATING AND USING CACHES IN CLIENT-SIDE CACHING

(75) Inventors: Thomas Ewan Jolly, Redmond, WA (US); James T. Pinkerton, Sammamish, WA (US); Eileen C. Brown, Seattle, WA (US); David Matthew Kruse, Kirkland, WA (US); Prashanth Prahalad, Bellevue, WA (US); Vikrant H. Desai, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 546 days.

(21) Appl. No.: 12/324,893

(22) Filed: Nov. 28, 2008

(65) Prior Publication Data
US 2010/0030871 A1    Feb. 4, 2010

Related U.S. Application Data

(60) Provisional application No. 61/084,980, filed on Jul. 30, 2008.

(51) Int. Cl.
G06F 15/16    (2006.01)
G06F 17/30    (2006.01)
H04L 29/06    (2006.01)

(52) U.S. Cl.
CPC .............. *G06F 17/30* (2013.01); *H04L 63/123* (2013.01)

(58) Field of Classification Search
USPC .................. 709/217–219, 248, 201, 203, 205
See application file for complete search history.

(56) References Cited

U.S. PATENT DOCUMENTS 5,452,447 A      9/1995  Nelson et al.
6,578,113 B2 *   6/2003  Krishnamurthy et al. .... 711/141
(Continued)

FOREIGN PATENT DOCUMENTS

WO    9903047 A1    1/1999
WO    2005084132 A2    9/2005

OTHER PUBLICATIONS

Kalnis, et al., "An Adaptive Peer•to•Peer Network for Distributed Caching of OLAP Results", Proceedings of the 2002 ACM SIGMOD International Conference on Management of Data, SESSION: Research session: data warehousing and archive, Dated: Jun. 4-6, 2002, pp. 25-36.

(Continued)

*Primary Examiner* — Abdullahi E Salad
(74) *Attorney, Agent, or Firm* — Henry Gabryjelski; Kate Drakos; Micky Minhas

(57) ABSTRACT

Aspects of the subject matter described herein relate to client-side caching. In aspects, when a client receives a request for data that is located on a remote server, the client first checks a local cache to see if the data is stored in the local cache. If the data is not stored in the local cache, the client may check a peer cache to see if the data is stored in the peer cache. If the data is not stored in the peer cache, the client obtains the data from the remote server, caches it locally, and publishes to the peer cache that the client has a copy of the data.

20 Claims, 5 Drawing Sheets

(56) References Cited

U.S. PATENT DOCUMENTS

| | | | |
|---|---|---|---|
| 6,661,904 | B1 | 12/2003 | Sasich et al. |
| 6,757,705 | B1 | 6/2004 | Pardikar et al. |
| 6,766,313 | B1 | 7/2004 | Kromann |
| 6,959,320 | B2 | 10/2005 | Shah et al. |
| 6,996,584 | B2 | 2/2006 | White et al. |
| 7,113,962 | B1 | 9/2006 | Kee et al. |
| 7,376,712 | B1* | 5/2008 | Granatelli et al. ............ 709/219 |
| 7,395,267 | B2* | 7/2008 | Hilbert et al. ................. 707/827 |
| 7,461,262 | B1* | 12/2008 | O'Toole, Jr. .................. 713/182 |
| 2001/0027479 | A1* | 10/2001 | Delaney et al. ............... 709/216 |
| 2002/0083178 | A1* | 6/2002 | Brothers ....................... 709/226 |
| 2003/0093488 | A1 | 5/2003 | Yoshida et al. |
| 2003/0236857 | A1 | 12/2003 | Takase et al. |
| 2004/0064650 | A1* | 4/2004 | Johnson ........................ 711/141 |
| 2004/0153576 | A1 | 8/2004 | Hansmann et al. |
| 2005/0102370 | A1 | 5/2005 | Lin et al. |
| 2006/0059348 | A1* | 3/2006 | Girard et al. .................. 713/176 |
| 2006/0184652 | A1 | 8/2006 | Teodosiu et al. |
| 2006/0248195 | A1 | 11/2006 | Toumura et al. |
| 2007/0050491 | A1 | 3/2007 | Kataoka et al. |
| 2007/0150575 | A1* | 6/2007 | Lowery et al. ................ 709/223 |
| 2007/0174426 | A1 | 7/2007 | Swildens et al. |
| 2008/0082648 | A1 | 4/2008 | Ahmed et al. |
| 2008/0229024 | A1* | 9/2008 | Plamondon ................... 711/126 |
| 2009/0006845 | A1* | 1/2009 | Charbonnier et al. ........ 713/156 |

OTHER PUBLICATIONS

Ip, et al., "COPACC: An Architecture of Cooperative Proxy-Client Caching System for On-Demand Media Streaming", IEEE Transactions on Parallel and Distributed Systems, vol. 18, Issue 1, Dated: Jan. 2007, 30 Pages.

Annapureddy, et al., "Shark: Scaling File Servers via Cooperative Caching", In Proceedings 2nd Symposium on Networked Systems Design and Implementation (NSDI), Dated: May 2005, 14 Pages.

Elkiss, et al., "Peercache: Query Result Caching using Peer Networks", Dated: Apr. 21, 2006, 30 Pages.

"International Search Report", Mailed Date: Dec. 2, 2009, Application No. PCT/US2009/041267, Filed Date: Apr. 21, 2009, pp. 11.

Iyer, et al., "Squirrel: A decentralized peer-to-peer web cache", Retrieved at <<http://research.microsoft.com/en-us/um/people/antr/PAST/squirrel.pdf>>, Proceedings of the twenty-first annual symposium on Principles of distributed computing, Jul. 21-24, 2002, pp. 213-222.

Fielding, et al., "Hypertext Transfer Protocol—HTTP/1.1", Jun. 1999, (aka RFC 2616), All pages (including sections 3.11, 13.3, 14.15-14.29).

* cited by examiner

POPULATING AND USING CACHES IN CLIENT-SIDE CACHING

CROSS REFERENCE TO RELATED APPLICATION

This application claims the benefit of U.S. Provisional Application No. 61/084,980, filed Jul. 30, 2008, entitled POPULATING AND USING CACHES IN CLIENT-SIDE CACHING SYSTEM, which application is incorporated herein in its entirety.

BACKGROUND

In deployments where client machines access data on file servers through a wide area network (WAN) or other slow connection, the performance characteristics of the WAN (high latency, low bandwidth) may make these data accesses slow. As a result, the client's experience of accessing the data over the WAN link may be degraded when compared to accessing the data over a high-speed LAN.

Even in deployments where client machines access data on file servers through a relatively high speed connection, the high speed connection may be expensive to send data through. Furthermore, even slow connections may be relatively expensive to send data through. In such environments, reducing traffic over the connection to the server may reduce expenses.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to client-side caching. In aspects, when a client receives a request for data that is located on a remote server, the client first checks a local cache to see if the data is stored in the local cache. If the data is not stored in the local cache, the client may check a peer cache to see if the data is stored in the peer cache. If the data is not stored in the peer cache, the client obtains the data from the remote server, caches it locally, and publishes to the peer cache that the client has a copy of the data.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. Other definitions, explicit and implicit, may be included below.

Exemplary Operating Environment

Figure 1:
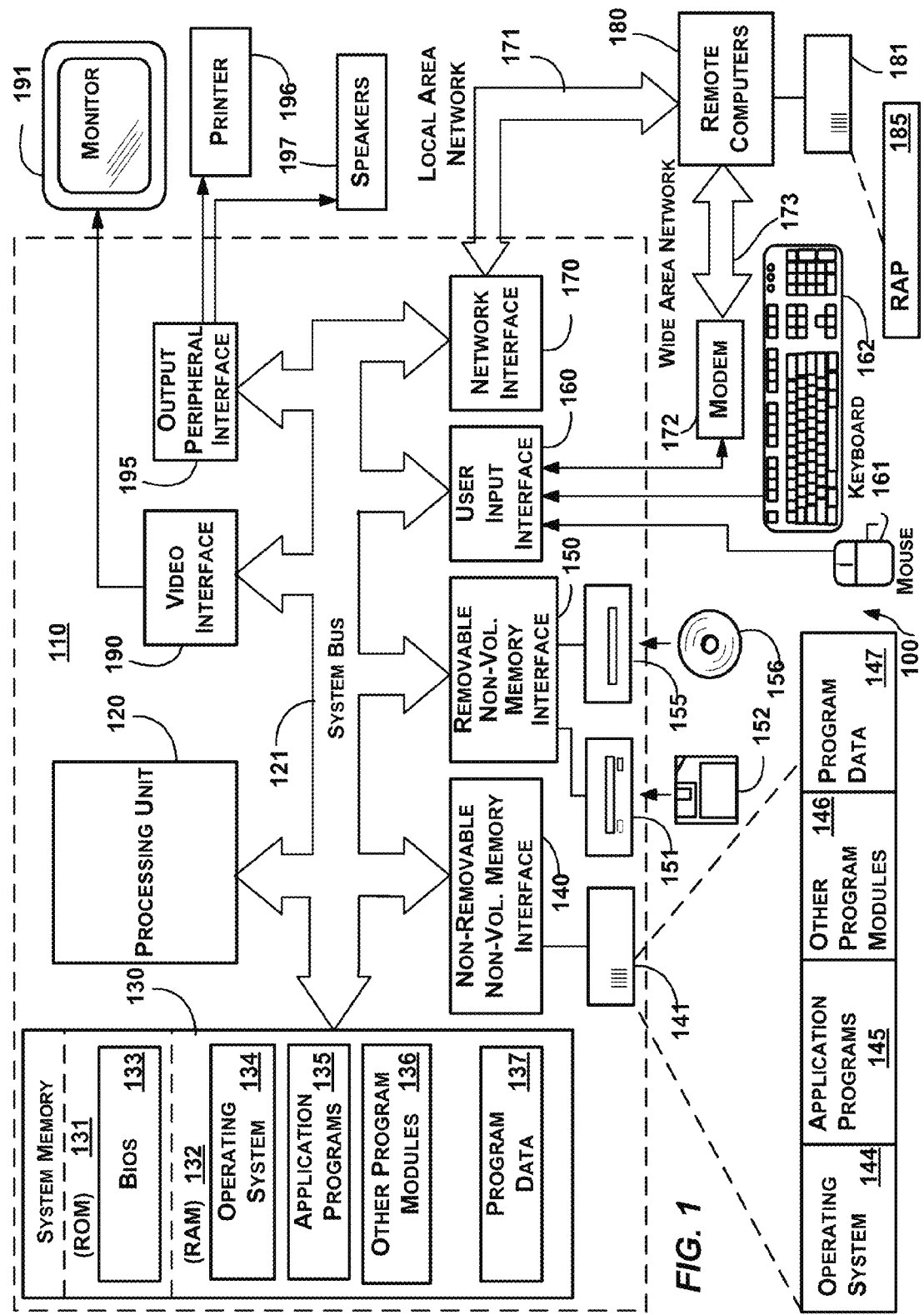
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Client-Side Caching

As mentioned previously, clients may be in an environment in which they access data over a slow or expensive connection. In such environments, reducing traffic over the connection may improve performance and reduce expenses. Although slow and expensive connections are sometimes mentioned herein, there is no intention to limit aspects of the subject matter described to slow or expensive networks. Indeed, it will be recognized by those skilled in the art that aspects of the subject matter may be employed between entities connected by any type of network.

Figure 2:
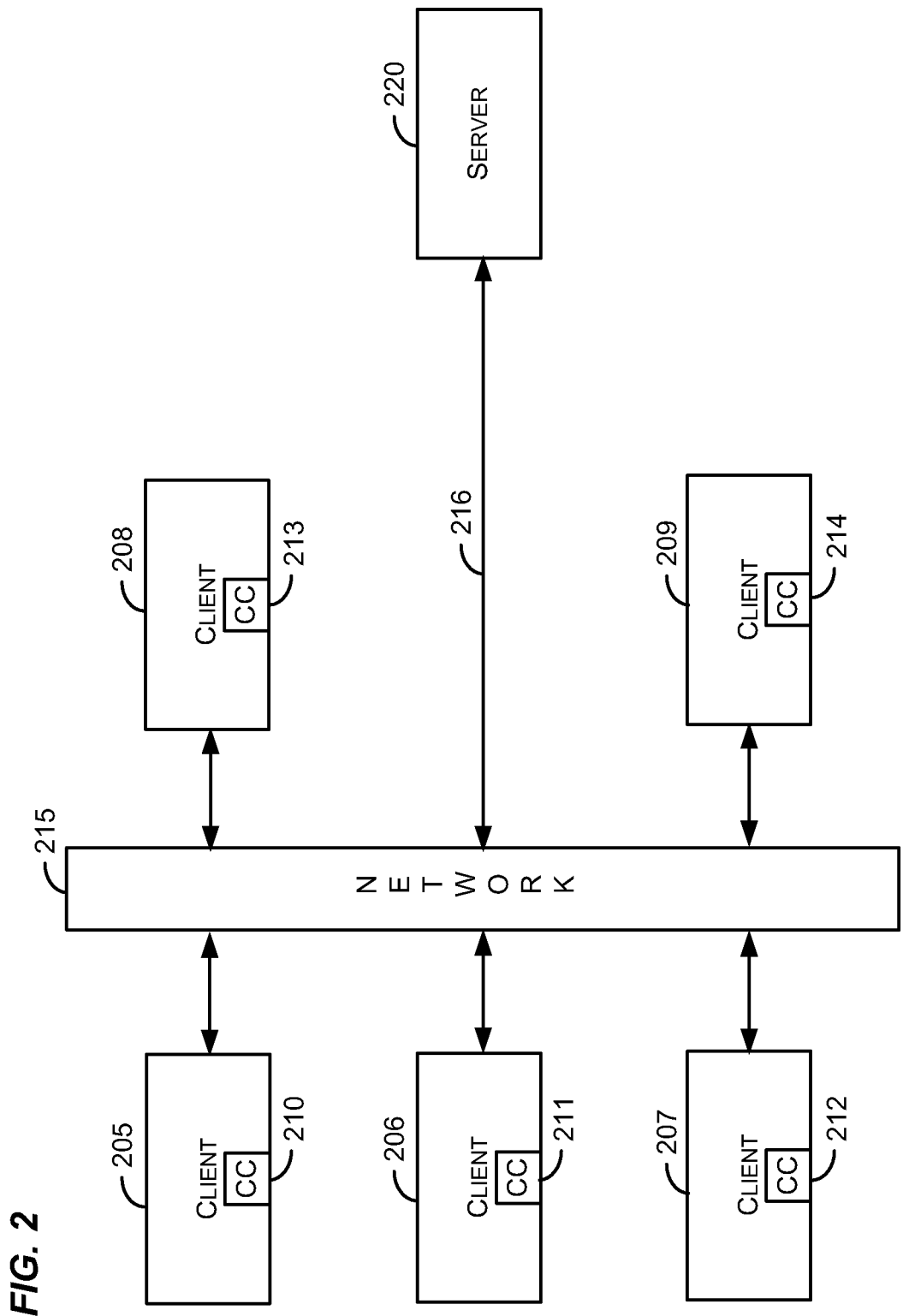
FIG. 2 is a block diagram representing an exemplary environment in which aspects of the subject matter described herein may be implemented.

FIG. 2 is a block diagram representing an exemplary environment in which aspects of the subject matter described herein may be implemented. The environment may include clients 205-209, a network 215, a link 216, a server 220, and may include other entities (not shown). The clients 205-209 may include caching components 210-214, respectively.

The clients 205-209 may be connected to a relatively fast and inexpensive network 215. One example of such a network is a local area network (LAN) where the clients 205-209 are connected to each other over one or more high-speed network devices. Aspects of the subject matter described herein, however, are not limited solely to LANs as some WANs and other networks may also be relatively fast or inexpensive. These other networks may also be used without departing from the spirit or scope of aspects of the subject matter described herein.

Communications between the clients 205-209 and the server 220 may travel across the link 216. The link 216 may comprise one or more local area networks, wide area networks, wireless networks, direct connections, virtual connections, private networks, virtual private networks, some combination of the above, and the like. In one embodiment, the link 216 may travel across components of the Internet. In some cases, the link 216 may be relatively expensive, have relatively high latency, or provide relatively low bandwidth. In one embodiment, the link may have relatively low latency and high bandwidth, but may be saturated because of the number of clients concurrently attempting to communicate with the server 220.

The clients 205-209 and the server 220 may comprise one or more general or special purpose computing devices. Such devices may include, for example, personal computers, server computers, hand-held or laptop devices, multiprocessor systems, microcontroller-based systems, set top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one or more of the clients 205-209 or server 220 comprises the computer 110 of FIG. 1.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. In an embodiment, one or more of the clients 205-209 and the server 220 may, at various times, be peers, servers, or clients. In one embodiment, one or more of the client 205-209 and the server 220 may be implemented on the same physical machine.

As used herein, each of the terms "server" and "client" may refer to one or more physical entities, one or more processes executing on one or more physical entities, and the like. Thus, a server may include an actual physical node upon which one or more processes execute, a service executing on one or more physical nodes, or a group of nodes that together provide a service. A service may include one or more processes executing on one or more physical entities.

As mentioned previously, the clients 205-209 may include caching components 210-214, respectively. Caching components on a client may include local caching components and peer-to-peer caching components. The peer-to-peer caching components may participate in a peer caching infrastructure that allows a client to look for desired data among peers connected via the network 215. If a client is not able to obtain the data via the peer caching infrastructure, the client may obtain the data from the server 220.

The peer caching infrastructure may allow a client to publish information that indicates the data a client has in the client's cache. A client may publish the information by providing one or more signatures (sometimes called "hashes") that correspond to the data the client has in the client's local cache. These one or more signatures may be provided to one or more of the other clients, to a node that tracks the data that each client has cached, or otherwise. A client that receives a signature from another client may store the signature in a data structure that associates the signature with the other client. In this way, when a client seeks the data, the client may look in the data structure to find one or more clients that have the data available.

A signature (sometimes referred to herein simply as a "hash") may comprise an identifier that is usable to identify data. A signature may be created by using a hash function or some other function that operates on the data to return the identifier. A signature may be much smaller than the data to which it corresponds.

Before a client obtains data from the server 220, the client may determine whether the client's local cache includes the data or a portion thereof. If any of the data is included in the client's local cache, the client may retrieve the data from the cache and thus avoid retrieving the data from the server 220. If some or all of the data is not found in the client's local cache, the client may request one or more hashes that correspond to the data from the server 220. For example, multiple hashes may be associated with a large file where each hash is computed from a portion of the file. Using the hashes, the client may use the client caching infrastructure to determine if any of the client's peers includes the data or any portion thereof. If data is found on the peers, the data found on the peers may be obtained from the peers and stored in the local cache of the client in addition to giving the data to the requesting software.

Before retrieving the data from any source, the client may determine whether the client has security rights to access the data. If a client does not have security rights to access the data (e.g., the client does not have rights to open a file), the server 220 may refrain from providing the data or a hash for the data to the client. In other words, before providing the client with data or a hash, the server 220 may verify that the client has rights to access the data. If the client does not have rights, the server 220 does not provide the data or one or more hashes to the client. To determine whether a client has rights to access data may involve using the normal security mechanisms (e.g., file, database, other access mechanisms, and the like) that the server 220 has. If the client is not allowed to access the data via the normal security mechanisms the server 220 has, the client is not provided the data or a hash to the data.

In one embodiment, the server 220 may use one or more key object to provide the one or more hashes to the client. Each key object may include data that identifies the client, that indicates that the client has access rights to the data, and that may be used to authenticate that the key object has not been changed. The client may use the one or more key objects to access the data from another client in the peer network. For example, the client may send a key object to a peer in order to obtain data corresponding to the key object from the peer.

Furthermore, in one embodiment, if the server determines that requested signatures are out of date (e.g., via a timestamp or otherwise), the server may re-calculate the signatures before providing them to the client. After the client has received the signatures, the client may use the signatures in determining whether the client's local cache and/or the peers include the desired data.

In some embodiments, the server 220 may refresh signatures in other ways. For example, in one embodiment, the server 220 may periodically check data on the server 220 to determine if the data has been updated. If so, the server 220 may update any signatures associated with the data. In this example, if the server 220 receives a request for a signature, the server 220 may still determine whether the signature is out of date and may re-calculate the signature if so as described previously.

In another example, the server 220 may update signatures in conjunction with changing data associated with the signatures. For example, when data is changed on the server 220, the server 220 may update any signatures associated with the data.

The examples above are not intended to be all-inclusive or exhaustive of the different mechanisms that may be used to generate or maintain signatures. Indeed, based on the teachings herein, those skilled in the art may recognize many other mechanisms for generating or maintaining the signatures that may also be used without departing from the spirit or scope of the subject matter described herein.

As mentioned previously, the clients 205-209 may be part of a data retrieval infrastructure (hereinafter sometimes referred to as a "peer cache") that tracks data that has been downloaded by the clients. When a client downloads and stores data from a server, the client may provide one or more signatures corresponding to the data to the peer cache. This is sometimes called "publishing" the data. The peer cache may store these signatures together with an identifier that identifies the client or clients that have the data. After the data has been published, when the peer cache is given a signature, the peer cache can determine one or more clients that have cached the data. The peer cache may then obtain the data from the one or more clients and provide it to the client that is requesting the data.

The term "peer cache" as described above may include one or more processes. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device.

The peer cache described above may have components that are distributed over one or more of the peer clients and/or may include a centralized or dedicated server (local to the clients 205-209) that tracks where data is stored on the clients.

In conjunction with opening a connection on the server, the client may determine whether or not the connection has performance characteristics that would justify local caching of the data. If the connection has these characteristics, an entry for data associated with the cache may be made in the local cache. The performance characteristics that justify local caching may be configured (e.g., by a system administrator or the like). In another embodiment, a client may maintain a list of servers. Any time the client requests data from a server in the list, the client may cache the data.

The performance characteristics may also be used to determine whether to check the peer cache for requested data. For example, if the performance characteristics indicate that the link does not justify caching, a client may not check the peer cache to see if the peer cache includes the data.

A client may have items that are "pinned" in its local cache. A "pinned" item is data that is not to be removed from the local cache to make room for other data to cache. If a client is running out of room in its local cache, the client is free to remove items that are not pinned to make room for new data to cache, but the client may not remove pinned data.

A client may operate in a mode where the client uses its local cache but does not use the peer cache. In this mode, the client checks to see if it has permission to access the data. If the client has permission to access the data, the client checks its local cache for the requested data. If the local cache does not include the requested data, the client then obtains the data from the remote server (instead of looking in the peer cache). After the client receives data from the server, if the performance characteristics of the link to the server justify local caching, the client caches the data. In one embodiment, the server may indicate whether data is cacheable on the client. In this embodiment the client caches the data only if the performance characteristics justify local caching and the server has indicated that the data is cacheable on the client.

A client may also have a component that reads ahead. For example, when an application of a client requests certain data, the component may determine, based on various criteria, whether to also request additional data that is subsequent to the data in a data stream. This may be done, for example, to speed access to the file. For example, if the application requests certain bytes of a file, the component may request additional subsequent bytes of the file. As another example, if the application requests bytes that comprise the header of a file (e.g., to check the type of the file), the component may determine that reading additional data is not desirable.

Although the environment described above includes various numbers of each of the entities and related infrastructure, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
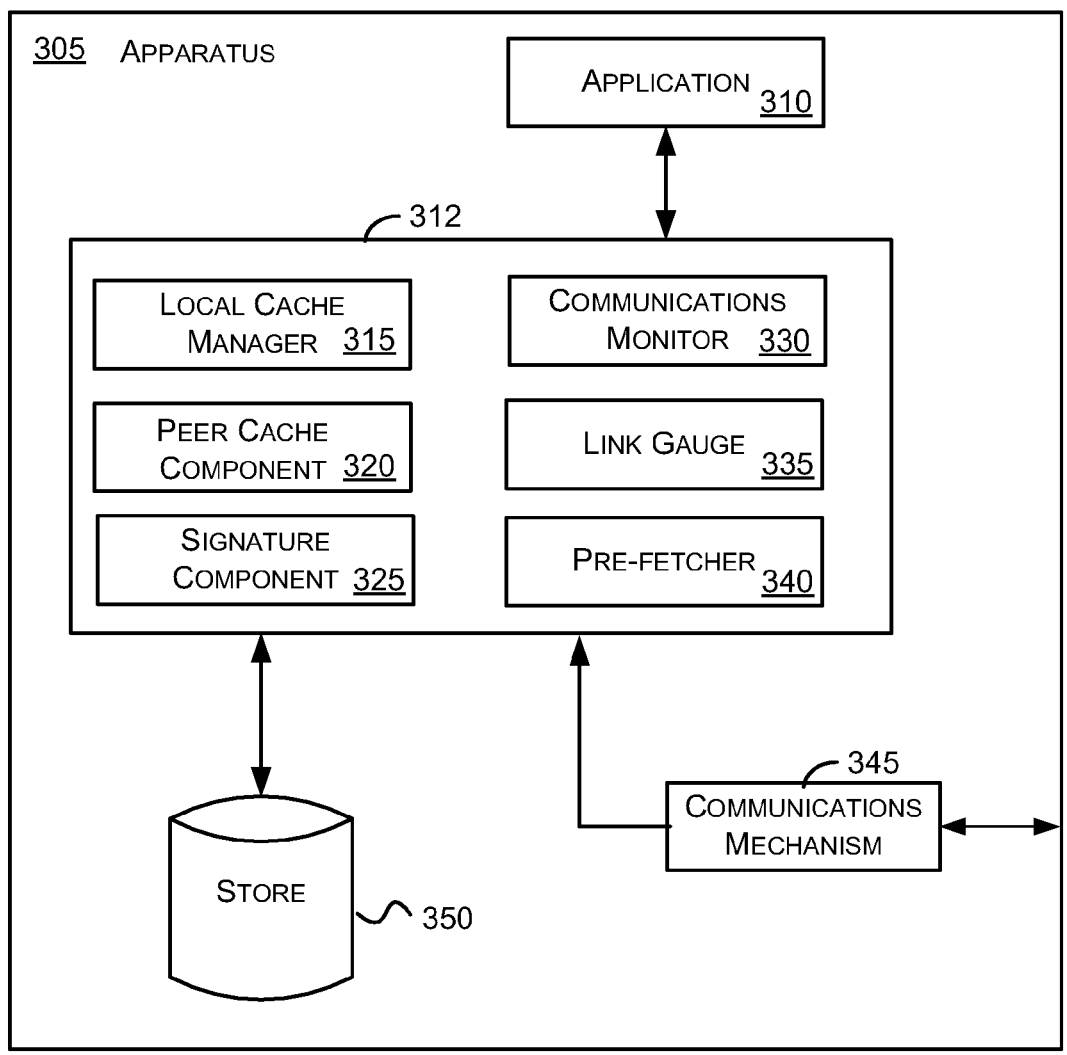
FIG. 3 is a block diagram that represents an apparatus configured as a client in accordance with aspects of the subject matter described herein.

FIG. 3 is a block diagram that represents an apparatus configured as a client in accordance with aspects of the subject matter described herein. The components illustrated in FIG. 3 are exemplary and are not meant to be all-inclusive of components that may be needed or included. In other embodiments, the components and/or functions described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices.

Turning to FIG. 3, the apparatus 305 may include an application 310, cache components 312, a communications mechanism 345, and a store 350. The cache components 312 may include a local cache manager 315, a peer cache component 320, a signature component 325, a communications monitor 330, a link gauge 335, and a pre-fetcher 340. The cache components 312 correspond to the caching components 210-214 of FIG. 2.

The application 310 may include one or more processes that are capable of requesting data from a server. For example, the application may comprise a word processing application, a spreadsheet application, an e-mail application, a Web browser, or some other application. These processes may use a file system API to request data from the server.

The communications mechanism 345 allows the apparatus 305 to communicate with other entities shown in FIG. 2. The communications mechanism 345 may be a network interface or adapter 170, modem 172, or any other mechanism for establishing communications as described in conjunction with FIG. 1.

The store 350 is any storage media capable of storing data. The term data is to be read to include information, program code, program state, program data, Web data, other data, and the like. The store 350 may comprise a file system, database, volatile memory such as RAM, other storage, some combination of the above, and the like and may be distributed across multiple devices. The store 350 may be external, internal, or include components that are both internal and external to the apparatus 305. The store 350 is operable to cache and provide access to data received by the apparatus 305.

The link gauge 335 is operable to determine whether a link has one or more characteristics that justify caching data received via the link. For example, if the link is over a latency threshold, is under a bandwidth threshold, is over a cost threshold, is connected to a specified server, or has other characteristics, the link gauge 335 may determine that the link has one or more characteristics that justify caching data received via the link.

The local cache manager 315 is operable to write client data received via a link into the store 350 and to provide access to the client data via the store 350. The local cache manager 315 may cache data received from links that the link gauge 335 has determined justify caching data received from the links.

The peer cache component 320 is operable to determine whether one or more other clients have cached data that is being requested by the application 310. These one or more other clients are sometimes referred to as the "peer cache." The peer cache component 320 may use a hash to obtain data from the peer cache as described previously. In addition, the peer cache component 320 may also be further operable to publish information that indicates data that is stored locally on the store 350 so that other peer clients may obtain this data.

The signature component 325 is operable to request an identifier from a server. As described previously, this identifier may comprise a hash of data requested by the application. The identifier may be returned in a key object as previously described.

The communications monitor 330 is operable to intercept requests sent from the application and to determine via the local cache manager 315 and the peer cache component 320 whether the data is cached locally or in the peer cache. The communications monitor 330 may "intercept" requests simply by sitting in the communications path (e.g., in a communications stack) between the application 310 and the communications mechanism 345. For example, the communications monitor 330 may reside in an input/output path of the client such that the communications monitor has an opportunity to examine requests addressed to entities outside of the client.

The pre-fetcher 340 is operable to obtain additional data that is related to the data the data requested by the application 310. For example, this additional data may comprise data in the same data stream (e.g., file or other data stream) that is subsequent to the requested data. The pre-fetcher may cache this additional data via the local cache manager 315.

When the client sends a request for data to the server, the client may, in the request, indicate that signatures associated with the data also be returned. For example, in applying aspects of the subject matter to the Server Message Block (SMB) protocol, the operation for requesting hashes may be combined with the SMB CREATE operation that a client sends when first attempting to access a file on a server. If the server has hashes for the file, the server may then return the hashes to the client and eliminate the need for the client to send a separate request for the hashes. Upon receiving the hashes in response to sending the SMB CREATE operation, the client then stores (in volatile or non-volatile memory) the hashes that are returned until the data of the file is read.

As another optimization to the SMB protocol, if the client has previously accessed data from the server and received one or more hashes associated with the data, then during a subsequent access to the same data, the client may forgo obtaining the hash(es) from the server for the previously accessed data.

Figure 4:
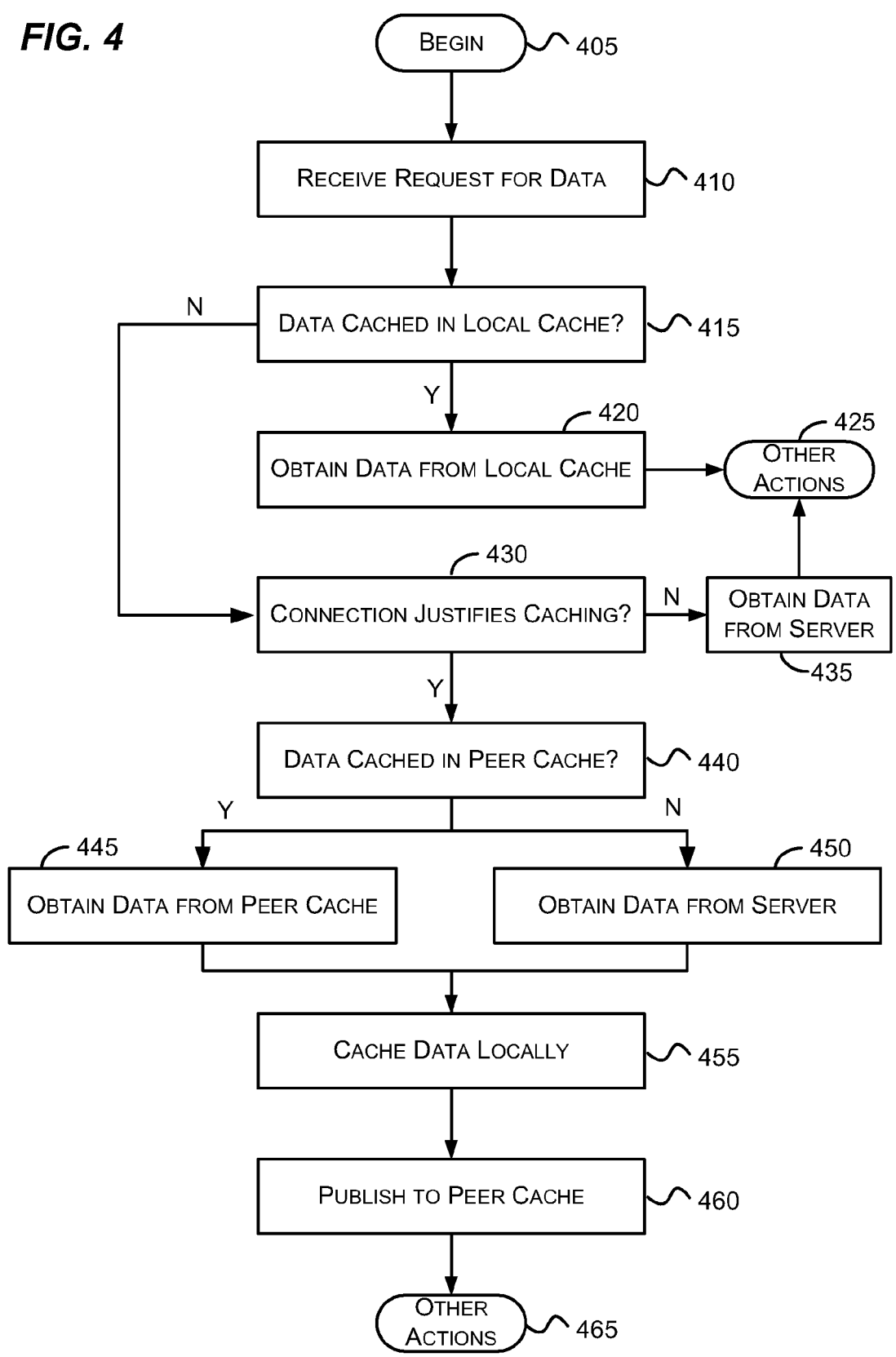
FIG. 4 is a flow diagram that generally represents actions that may occur from a client perspective in accordance with aspects of the subject matter described herein.
Figure 5:
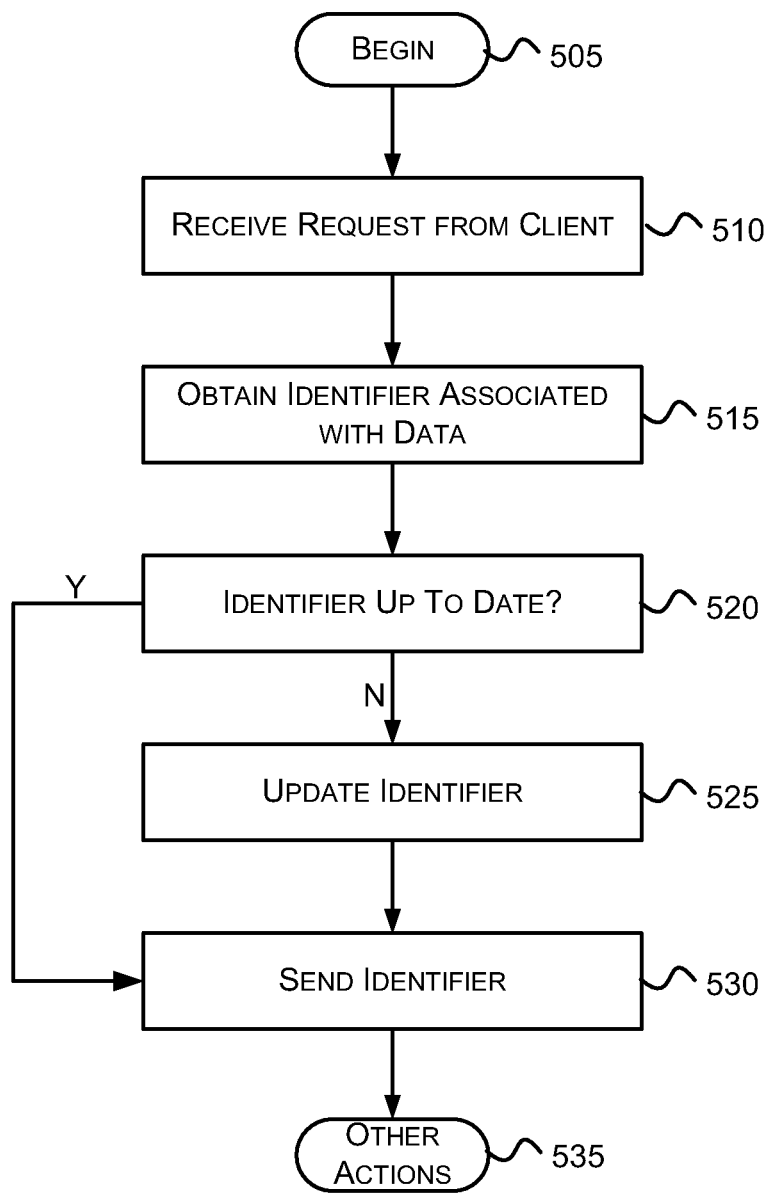
FIG. 5 is a flow diagram that generally represents actions that may occur from a server perspective in accordance with aspects of the subject matter described herein.

FIGS. 4-5 are flow diagrams that generally represent actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents actions that may occur from a client perspective in accordance with aspects of the subject matter described herein. Turning to FIG. 4, at block 405, the actions begin. Before (or after) proceeding to the actions associated with block 410, a check may be performed to determine whether a client has rights to access the data it seeks to access. If the client does not have rights, the client may be denied access to the data.

At block 410, a request is received at a client for data that is located on a remote server. For example, referring to FIG. 220, the caching components 210 of the client 205 receive a request for data that is located on the server 220.

In one embodiment, a "remote" server may be defined as a server that takes X milliseconds for a roundtrip packet from the client where X may be hard-coded or configured by a system administrator or the like. In another embodiment, a "remote" server may be defined as a server that has bandwidth to the client less than Y where Y may be hard-coded or configured by a system administrator or the like. In another embodiment, a "remote" server may be defined as a server reached over a link having a cost greater then Z where Z is hard-coded or configured by a system administrator or the like. In yet another embodiment, a "remote" server may be a server that is listed in a list maintained on the client. The examples above are not intended to be all-inclusive or exhaustive. Indeed, many other criteria may be used to determine whether a server is a "remote" server or not without departing from the spirit or scope of aspects of the subject matter described herein.

At block 415, a determination is made as to whether the data is cached in a local cache. If so, the actions continue at block 420; otherwise, the actions continue at block 430. For example, referring to FIG. 3, the local cache manager 315 determines whether the data is stored on the store 350. Note that if a portion of the data is stored on the store 350 that this portion of the data may be retrieved from the local cache while the actions associated with blocks 430-460 may occur for other portions of the data that are not stored in the local cache.

At block 420, the data is obtained from the local cache. For example, referring to FIG. 3, the local cache manager 315 obtains the requested data from the store 350 and returns it to the communications monitor 330 which forwards the data to the application 310. Even when the data is found on the local cache, a connection with the remote server may also be established. If the client modifies the data and saves it, the connection to the remote server may be used to save the data to the remote server.

At block 425, other actions, if any, are performed.

At block 430, a determination is made as to whether the connection justifies local caching. If so, the actions continue at block 440; otherwise, the actions continue at block 435. For example, referring to FIG. 2, depending on one or more characteristics of the link 216, the client 205 may determine whether the connection to the server justifies caching and hence would justify a lookup in the peer cache.

At block 435, the data is obtained from the server. For example, referring to FIG. 2, the client 205 may obtain data from the server 220 without checking the peer cache on the other clients. After block 435, the actions may continue at block 425 where other actions, if any, may be performed.

At block 440, a determination is made as to whether the requested data is included in a peer cache. If so, the actions continue at block 445; otherwise, the actions continue at block 450. For example, referring to FIGS. 2 and 3, the peer cache components 320 may determine whether the data is stored on one or more of the other entities that are local to the client 205. Such entities may include the clients 205-209 or a local server (not shown). Local entities may be defined by roundtrip packet time, bandwidth, cost, IP addresses, a list or other data structure, connection to a local area network, other criteria, or the like. If a portion of the data is on one or more local entities, this portion of the data may be retrieved from the local entities while the actions associated with block 450 may be performed for the portion of data that is not in the local cache nor on the local entities.

At block 445, the data is obtained from the peer cache. For example, referring to FIG. 2, the client 205 may obtain the data from one or more of the clients 206-209.

At block 450, the data is obtained from the remote server. For example, referring to FIG. 2, the data may be obtained from the server 220.

In some embodiments, the data may be requested from the server and from the peer cache in parallel. Data received that is a duplicate of data already received may be discarded. Requesting the data in parallel from the server and the peer cache may be done, for example, so that the application requesting the data may proceed forward as quickly as possible.

At block 455, the data is cached in the client's local cache. For example, referring to FIG. 3, the local cache manager 315 caches the data received from the server in the store 350. In some embodiments, for data received from local entities, the data may be cached or not cached depending on configuration settings on the client 205. In some embodiments, all data received from peer clients may be cached. In other embodiments, data received from peer clients may cached depending on various criteria.

At block 460, the client publishes information to the peer cache to indicate that the data is cached in the client's local cache. For example, referring to FIGS. 2 and 3, the peer cache component 320 of the client 205 sends information to the clients 206-209 that indicates data that is cached on the client 205.

At block 465, other actions, if any, are performed.

FIG. 5 is a flow diagram that generally represents actions that may occur from a server perspective in accordance with aspects of the subject matter described herein. At block 505, the actions begin.

At block 510, a request for an identifier is received from a client. For example, referring to FIG. 2, the server 220 receives a request for an identifier associated with some data on the server.

At block 515, an identifier (e.g., hash) associated with the data is obtained. For example, referring to FIG. 2, the server obtains the identifier. The server may obtain the identifier by generating the identifier, retrieving the identifier from storage, or using other mechanisms as described previously.

At block 520, a determination is made as to whether the identifier is up to date. If so, the actions continue at block 530; otherwise, the actions continue at block 525. For example, if the data changed after the identifier was generated, the identifier is not up to date and needs to be re-generated.

At block 525, the identifier is updated. For example, referring to FIG. 2, the server 220 re-generates and updates the identifier before sending it to the client 205. In another embodiment, if the server 220 determines the identifier is out-of-date, it returns an error to the client 205. Then, asynchronous to the identifier request, the server 220 re-generates the identifier. A goal of this process is to have the re-generation work completed by the time the next client requests the identifier, although that is not guaranteed. Until an up-to-date identifier is generated, clients requesting the identifier get an error from the server for that operation.

At block 530, the identifier is sent to the client. For example, referring to FIG. 2, the server 220 sends the identifier to the client 205.

At block 535, other actions, if any, are performed.

As can be seen from the foregoing detailed description, aspects have been described related to client-side caching. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

receiving, at a client, a request for data that is located on a remote server;

sending a first request for at least one signature that represents the data to the remote server;

in response to sending the first request, receiving at least a first signature and a second signature from the remote server, wherein the first signature and the second signature each represents a portion of the data;
determining, based at least on the first signature obtained from the remote server, if a first portion of data is cached in a peer cache;
when it is determined that the first portion of data is cached in the peer cache, sending a second request for the first portion of data to the peer cache;
determining, based at least on the second signature obtained from the remote server, if a second portion of data is cached in the peer cache; and
when it is determined that the second portion of data is not cached in the peer cache:
sending a third request for the second portion of data to the remote server;
storing the second portion of data in a local cache of the client;
making the second portion of data available to one or more requesting devices; and
sending the second portion of data from the client to at least one of the one or more requesting devices in response to receiving a request for the second portion of data.

2. The method of claim 1, wherein determining if the first portion of data is cached in the peer cache comprises accessing a data structure that includes signatures and identifiers, the data structure associating the signatures with one or more of the identifiers, each identifier indicating a client of the peer cache that has data indicated by one or more signatures associated with the identifier.

3. The method of claim 1, further comprising determining that a connection to the remote server has characteristics that justify caching the data received from the remote server.

4. The method of claim 3, further comprising receiving input that indicates that the characteristics that justify the caching of the data is received from the remote server.

5. The method of claim 1, wherein receiving, at a client, a request for data that is located on a remote server comprises receiving the request at a component of the client, the component residing in an input/output path of the client such that the component has an opportunity to examine requests addressed to entities outside of the client.

6. The method of claim 1, further comprising:
determining whether a third portion of data is cached in a local cache of the client; and
when it is determined that the third portion data is cached in the local cache, obtaining the third portion data from the local cache.

7. The method of claim 1, wherein the first signature indicates the client has rights to access the first portion of data.

8. The method of claim 1, further comprising opening a connection to the remote server and updating the data on the remote server via the connection when it is determined that the first portion of data is cached in the peer cache.

9. The method of claim 1, wherein making the second portion of data available comprises publishing information indicating that the second portion of data is stored in the local cache of the client.

10. A computer-readable storage device encoding computer executable instructions that, when executed by at least one processor, performs a method comprising:
receiving a request for data located on a remote server;
sending a first request for at least one signature that represents the data to the remote server;
in response to sending the first request, receiving at least a first signature and a second signature from the remote server, wherein the first signature and the second signature each represents a portion of the data;
determining, based at least on the first signature obtained from the remote server, if a first portion of data is cached in a peer cache;
when it is determined that the first portion of data is cached in the peer cache, sending a second request for the first portion of data to the peer cache;
determining, based at least on the second signature obtained from the remote server, if a second portion of data is cached in the peer cache; and
when it is determined that the second portion of data is not cached in the peer cache:
sending a third request for the second portion of data to the remote server;
storing the second portion of data in a local cache of the client;
making the second portion of data available to one or more requesting devices; and
sending the second portion of data from the client to at least one of the one or more requesting devices in response to receiving a request for the second portion of data.

11. The computer-readable storage device of claim 10, wherein determining if the first portion of data is cached in the peer cache comprises accessing a data structure that includes signatures and identifiers, the data structure associating the signatures with one or more of the identifiers, each identifier indicating a client of the peer cache that has data indicated by one or more signatures associated with the identifier.

12. The computer-readable storage device of claim 10, further comprising instructions for determining that a connection to the remote server has characteristics that justify caching the data received from the remote server.

13. The computer-readable storage device of claim 10, further comprising instructions for receiving input that indicates that the characteristics that justify the caching of the data is received from the remote server.

14. The computer-readable storage device of claim 10, wherein receiving a request for data that is located on a remote server comprises receiving the request at a component of the client, the component residing in an input/output path of the client such that the component has an opportunity to examine requests addressed to entities outside of the client.

15. The computer-readable storage device of claim 10, wherein making the second portion of data available comprises publishing information indicating that the second portion of data is stored in the local cache of the client.

16. A computer system for caching data, the system comprising:
one or more processors; and
a memory coupled to the one or more processors, the memory for storing instructions which, when executed by the one or more processors, cause the one or more processors to perform a method comprising:
receiving a request for data located on a remote server;
sending a first request for at least one signature that represents the data to the remote server;
in response to sending the first request, receiving at least a first signature and a second signature from the remote server, wherein the first signature and the second signature each represent a portion of the data;
determining, based at least on the first signature obtained from the remote server, if a first portion of data is cached in a peer cache;
when it is determined that the first portion of data is cached in the peer cache, retrieving the first portion of data from the peer cache;

determining, based at least on the second signature obtained from the remote server, if a second portion of data is cached in the peer cache; and when it is determined that the second portion of data is not cached in the peer cache:

sending a third request for the second portion of data to the remote server;

storing the second portion of data in a local cache of the client;

making the second portion of data available to one or more requesting devices; and sending the second portion of data from the client to at least one of the one or more requesting devices in response to receiving a request for the retrieved data.

17. The computer system of claim 16, wherein determining if the first portion of data is cached in the peer cache comprises accessing a data structure that includes signatures and identifiers, the data structure associating the signatures with one or more of the identifiers, each identifier indicating a client of the peer cache that has data indicated by one or more signatures associated with the identifier.

18. The computer system of claim 16, further comprising instructions for determining that a connection to the remote server has characteristics that justify caching the data received from the remote server.

19. The computer system of claim 16, further comprising instructions for receiving input that indicates that the characteristics that justify the caching of the data is received from the remote server.

20. The computer system of claim 16, wherein making the second portion of data available comprises publishing information indicating that the second portion of data is stored in the local cache of the client.

* * * * *